United States Patent [19]

Yeoman et al.

[11] Patent Number: 4,535,622
[45] Date of Patent: Aug. 20, 1985

[54] NON-CLOGGING DEPOSIT MONITOR

[75] Inventors: Alan M. Yeoman, Naperville; Richard J. Mouché, Batavia, both of Ill.

[73] Assignee: Nalco Chemical Company, Oak Brook, Ill.

[21] Appl. No.: 518,182

[22] Filed: Jul. 28, 1983

[51] Int. Cl.³ .............................................. G01N 15/00
[52] U.S. Cl. ...................................... 73/61.2; 73/61 R; 73/53
[58] Field of Search ........... 73/61.2, 61 R, 63, 861.04; 116/264; 222/564; 141/83

[56] References Cited

U.S. PATENT DOCUMENTS

| | | | |
|---|---|---|---|
| 1,627,010 | 5/1927 | Campbell | 73/63 |
| 2,602,325 | 7/1952 | Campbell et al. | 73/63 |
| 2,973,000 | 2/1961 | Pearson | 73/63 |
| 3,359,786 | 12/1967 | Von Alfthan | 73/61 R |
| 3,893,334 | 7/1975 | Williams | 73/61 R |

FOREIGN PATENT DOCUMENTS

| | | | |
|---|---|---|---|
| 1164118 | 2/1964 | Fed. Rep. of Germany | 73/61 R |
| 1197130 | 11/1959 | France | 73/61 R |
| 599398 | 10/1959 | Italy | 73/61 R |
| 1005607 | 9/1965 | United Kingdom | 73/55 |

*Primary Examiner*—Stewart J. Levy
*Assistant Examiner*—Hezron E. Williams
*Attorney, Agent, or Firm*—John G. Premo; Donald G. Epple

[57] ABSTRACT

A deposit monitor comprising a constant head tank which empties into a graduated cylinder and a cylindrical drain fitted with an inner tube which defines an annular space. Water flowing through the constant head tank into the graduated cylinder, if it is deposit forming, will gradually plug the annular space and increase the liquid level in the second tank, thereby providing a simple method for determining whether or not scaling is occurring.

3 Claims, 1 Drawing Figure

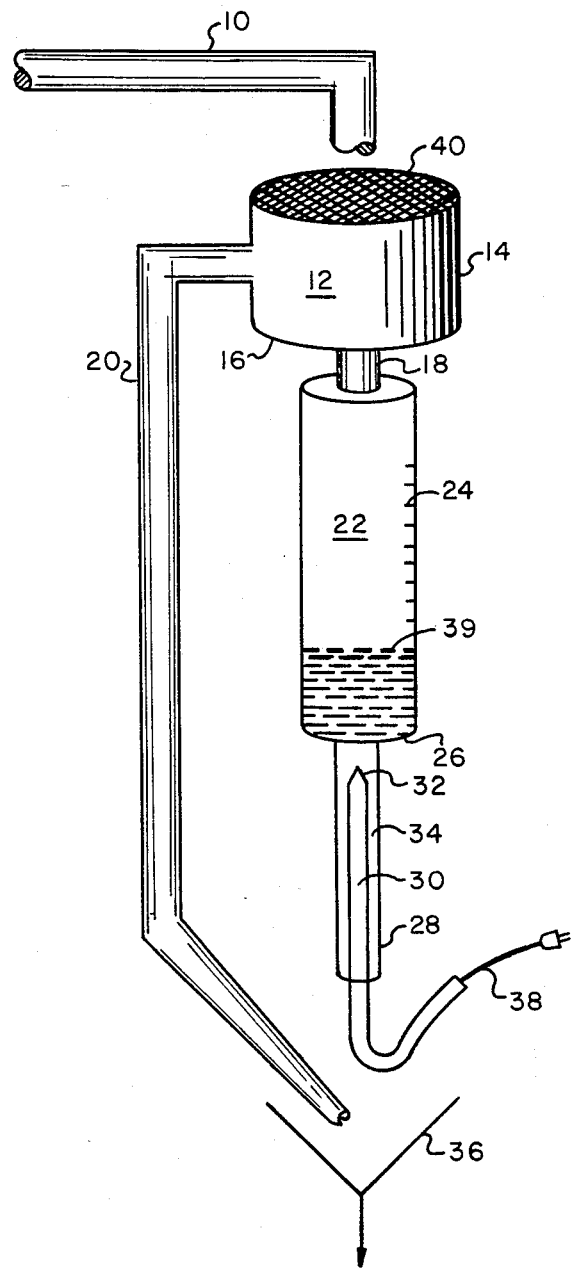

NON-CLOGGING DEPOSIT MONITOR

INTRODUCTION

Both blast furnaces and basic oxygen furnaces (BOF) produce hot gases containing iron particulates, oxides of calcium, and $CO_2$. These are scrubbed from the gas using recirculating water. This recirculating particulate-containing water tends to scale such equipment as pumps, transfer lines, and venturis. Monitoring of this deposition in the past has proven fruitless due to the iron particulate matter in the water. The fouling monitors which have been used would tend to plug up before any scales could be measured.

A non-plugging deposit monitor of simple design capable of detecting deposit formation in waters containing particulates and other scale-forming components would be an advance in the art.

In addition to detecting the deposit-forming characteristics of gas scrubber waters, the device of the invention is also useful for monitoring the scale-forming tendency of other industrial cooling waters.

THE DRAWING

The drawing is a schematic vertical view of the device of the invention.

THE INVENTION

With specific reference to the drawing, there is shown a water influent line 10 which discharges water through a rough screen 40 into a constant head tank 12 having a side wall 14, a bottom 16, and a drain 18. The constant head tank 12 is also fitted with an overflow line 20.

In practice, a sample of the water to be tested is taken from any place in the system sought to be monitored. In most industrial systems, this would be from a recirculating line of a high solids water blast furnace gas scrubber. The water would be continuously flowed through a rough screen and into the constant head tank 12 which provides a uniform volume of water continually leaving the constant head tank through drain 18. Drain 18 discharges into a second tank 22 which, in a preferred embodiment of the invention, is a graduated cylinder containing appropriate liquid level markings 24. The bottom 26 of the second cylinder is fitted with an outer drain tube 28. Within the outer drain tube 28 is a cylindrical tube on rod 30 whose top portion 32 is conically tipped or shaped. The inner tube 30 is of smaller diameter than the outer tube, thereby defining an annular space 34.

In a preferred embodiment of the invention, the inner tube is fitted with appropriate heating means 38. These heating means allow the water to be elevated to a temperature corresponding to that encountered within the system sought to be monitored. It also allows scale buildup to be accelerated if this is desired.

The bottom of the drain tube empties into a suitable drain 36. The drain 36 also receives discharge from the overflow line 20.

In operation, as water is discharged from drain 18 into the second tank or graduated cylinder 22, an equilibrium level 39 is established. Water flows from the second tank through the annular space and into the drain. Since the annular space is constricted and large particles have been removed by the rough screen, particulate matter deposit will tend to build up within this space, thereby causing a partial plugging or reduction in flow rate. This will cause the liquid level in the second tank to gradually increase. An unskilled plant operator can observe the cylindrical tank if it is graduated and made of a clear material. When an increase in liquid level is observed, it will be known that deposits or scale could be occurring within the equipment of the system being serviced by the waters monitored by the apparatus of the invention.

SUMMARY

The need to field monitor deposit formation in water systems containing high levels of suspended solids necessitated the invention of the non-clogging deposit monitor. Other deposit monitors have been used successfully for waters containing low levels of suspended solids but found to be ineffective for waters containing high suspended solid levels due to the solids clogging these monitors.

The first application of the invention was for high suspended solids process waters in the steel industry. Scale-type deposit formation can occur in process water system equipment such as transfer lines, pumps, and venturis which can cause the shutdown of the system. The non-clogging deposit monitor has been found to be a valuable tool for detecting and monitoring deposit formation in these systems before equipment so adjustments can be made before failure occurs.

In addition to detecting scale type deposits, the monitor can detect microbiological foulant deposits and other general deposit.

Because a wide variety of water systems contain high levels of suspended solids, the non-clogging deposit monitor would be useful for many applications.

A non-clogging deposit monitor of simple design capable of detecting deposit formation in waters containing suspended solids and other deposit forming components would be an advance in the art.

Having thus described our invention, it is claimed as follows:

1. A non-clogging deposit monitor for measuring the tendency of inorganic particulate containing water to form scale deposits on equipment surfaces exposed thereto comprising a constant head tank having associated therewith a rough inlet screen, an overflow line, and a head tank drain positioned in its bottom; a vertically disposed cylindrical tank having marked thereon volume indicating graduations positioned below the constant head tank drain and adapted to receive the entire discharge from said drain and fitted with a drain tube at the bottom of the cylindrical tank; and a conically tipped cylindrical member of smaller diameter than the drain tube positioned concentrically within said drain tube, thereby defining an annular opening between the drain tube and the cylindrical member.

2. A method of monitoring inorganic deposits in particulate containing waters which comprises flowing inorganic particulate containing water through the deposit monitor of claim 1 for a period of time sufficient to cause deposit formation and then noting any increase in volume occurring within the vertically disposed cylindrical tank, which increase in volume represents the relative degree of deposit formation.

3. The deposit monitor of claim 1 wherein the conically tipped cylindrical member has associated therewith means for heating same.

* * * * *